United States Patent Office 3,277,796
Patented Oct. 11, 1966

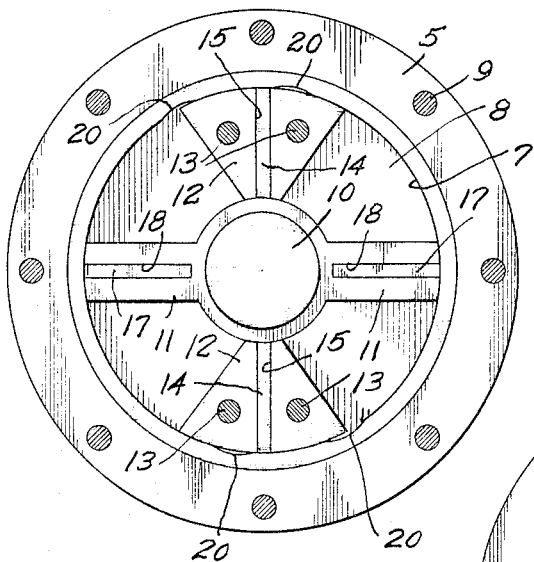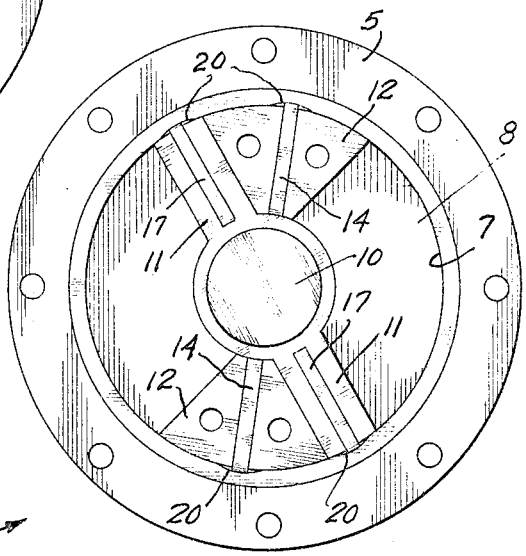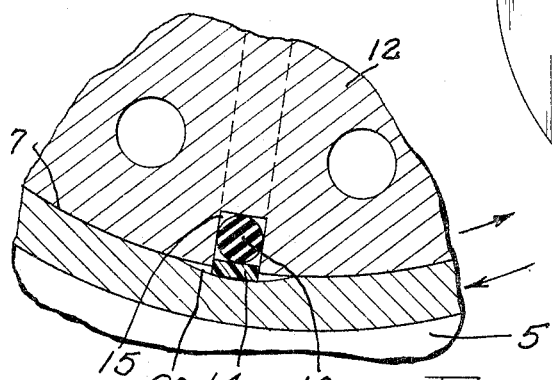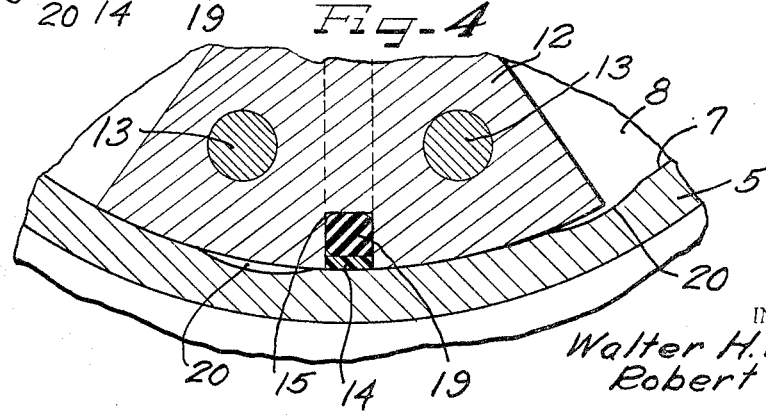
INVENTORS
Walter H. Wessel
Robert E. King

3,277,796
METHOD OF AND MEANS FOR ASSEMBLING WINGSHAFTS AND ABUTMENTS IN ROTARY FLUID PRESSURE DEVICES
Walter H. Wessel and Robert E. King, Orchard Park, N.Y., assignors to Houdaille Industries, Inc., Buffalo, N.Y., a corporation of Michigan
Filed Sept. 17, 1963, Ser. No. 309,525
20 Claims. (Cl. 92—125)

This invention relates to improvements in rotary fluid pressure devices, and more particularly concerns an improved method of and means for assembling into the housings of such devices the wingshafts and abutments having pressure seals.

In order to avoid leakage past the abutments and the wingshafts in rotary fluid pressure devices such as rotary hydraulic actuators, motors, and the like, pressure seals are mounted in the edges thereof. Thus, a pressure seal is mounted in each wingshaft vane to engage with the opposing bore surface of the generally ring-shaped housing body and the end walls or caps defining the working chamber space within the unit. A similar pressure seal is mounted in each abutment to contact the opposing surfaces of the housing.

Due to the necessarily close tolerances between the opposing mating surfaces of the wingshaft vanes and of the abutments and the bore of the housing, a serious problem is encountered when the wingshaft and abutment or abutments are axially assembled, due to the necessity of compressing the pressure seals to clear into the housing bore. Commonly this has been effected by placing shim stock, that is, very thin tough sheet metal, protectively between the seals and the housing bore surface. However, this is a time-consuming expedient and the seals are quite often damaged when the tightly pressed shims are removed after assembly has been completed.

It is, accordingly, an important object of the present invention to provide a new and improved method of and means for assembling pressure seal equipped wingshafts and abutments into the housing bores of the fluid pressure devices in a manner requiring no substantial compression of the seals until assembly is completed.

Another object of the invention is to provide a method of and means for assembling pressure sealed wingshafts and abutments in the bores of fluid pressure device housings without any substantial compression of the seals until after assembly has been completed, whereafter placing of the seals under compression between the wingshaft and abutment with the housing bore wall in each instance is easily and efficiently accomplished without danger of damaging the seals.

A further object of the invention is to provide a new, simple, efficient method of assembling pressure sealed wingshafts and abutments with hydraulic rotary pressure devices and simple and highly efficient means for practicing the method.

According to the general features of the invention, assembly is effected between parts having mating interface engagement with a pressure seal therebetween by providing a ramp-sided groove in one of the parts and assembling the parts in a manner to introduce longitudinally into the groove a projecting portion of the compressible pressure seal mounted in a recess in the other part, whereafter the parts are relatively shifted laterally relative to the groove to ease the projecting seal portion across the groove ramp and thereby compress it into the recess until the groove has been cleared and it sealingly engages the interface of said one part.

Other objects, features and advantages of the present invention will be readily apparent from the following detailed description of a preferred embodiment thereof taken in conjunction with the accompanying drawing, wherein:

FIGURE 1 is a plan view of a rotary fluid pressure device embodying features of the invention;

FIGURE 2 is a plan view similar to FIGURE 1 but showing the parts being assembled;

FIGURE 3 is an enlarged fragmentary sectional detail view showing how a pressure seal is adapted to be accommodated during assembly; and FIGURE 4 is a similar enlarged fragmentary sectional detail view showing the parts after assembly has been completed.

A typical rotary fluid device such as a rotary actuator, motor, and the like, includes a housing comprising a body 5 (FIG. 1) defining a cylindrical working chamber bore 7 closed at one end by an end wall 8 and at the opposite end by a similar end wall (not shown), one or both of the end walls being a removable cap or disk member attached to the housing body by means such as bolts 9. Relatively rotatably mounted concentrically within the working chamber is a wingshaft 10 having one or more wing vanes 11 which cooperate with a corresponding number, namely, one or more, of abutments 12 to divide the working chamber into subchambers. Suitable means such as dowels 13 secure the abutments fixedly in place. As is well-known, the wingshaft vanes 11 have respective outer edges having surfaces which mate with fairly close tolerance slidably in the bore 7. Similarly, the abutments 12 have surfaces which mate with fairly close tolerance within the bore 7 and with the perimeter of the wingshaft 10 between the vanes 11.

In order to seal the interfitting surfaces of the vanes 11 and the housing, and the interfitting surfaces of the abutments 12 and the housing and the wingshaft, pressure seals on the order of those disclosed and covered in Patent 3,021,822 issused February 20, 1962, are employed. One such seal 14 is mounted in a suitable groove recess 15 in each of the abutments 12. A similar seal 17 is mounted in a slot recess 18 in each of the vanes 11. Desirably the seals 14 and 17 are in the form of molded solid elastomer material having low coefficient of friction of which the moldable plastic polytetrafluorethylene, commercially available under the trademark "Teflon," is desirable although nylon or a like material may also be used. For thrusting the seal strips or rings 14 and 17 outwardly from their respective grooves or slots so as to effect a tight sealing engagement against the opposed housing surfaces, pressure applying means such as rubber O-rings 19 (FIG. 3) are mounted behind the respective seal strips and normally act to thrust the associated sealing strip partially out of its groove or slot. Substantial inward pressure is then required to displace the sealing strip inwardly against and to effect deformation and displacement of the solid pressure backing O-ring 19. As mentioned hereinbefore, this has created a substantial problem in effecting assembly of the wingshaft and abutments equipped with this type of pressure seal into the bore 7 of the housing.

According to the present invention, assembly of the wingshaft and abutments is easily and quickly effected without requiring either precompression of the seal, nor any type of shimming. To this end, a shallow relatively large radius, open ended, inwardly opening, longitudinally extending ramp-sided groove 20 is provided in the surface defining the bore 7 and of a depth to receive the expanded, outwardly projecting portion of the seal substantially freely and without any substantial pressure. Thereby, a free relative axial assembly of the seal carrying member and the housing is enabled, substantially into the relationship depicted in FIGURES 2 and 3. Then by relative turning, shifting displacement of the seal carrying member and the housing, substantially as indicated by directional arrows in FIGURE 3 (which is representative of assembling either the seal 14 or the seal 17), the gradual, low pitch ramp provided by the side of the groove gently and progressively eases and compresses the seal inwardly until it rides laterally onto the bore surface and full sealing relationship of the seal is attained, substantially as shown in FIGURE 4.

Where a single abutment and a single vane wingshaft are to be assembled in the housing, a single groove 20 may suffice for effecting assembly of both of the seal carrying members, namely the single abutment and the single wingshaft vane. In such case, the seal carrying members are placed in assembly with the housing successively.

In a multi-abutment and vane arrangement such as the dual abutment and dual vane arrangement depicted in FIGURES 1 and 2, at least a pair of the assembly grooves 20 at diametrically opposite points in the bore wall surface are provided for simultaneously receiving diametrically opposite seal members of the wingshaft vanes, for example. However, in a more convenient arrangement, the grooves 20 are provided in sets of two adjacent spaced parallel grooves so spaced apart that all of the abutments and all of the wingshaft vanes can be assembled with the housing simultaneously as a unit, substantially as depicted in FIGURE 2. Hence, the abutments 12 are assembled on diametrically opposite sides of the wingshaft 10 alongside and in abutment with the respective vanes 11 which thus serve as locating or orienting members for the abutments. The assembly of wingshaft and abutments is then aligned with the housing bore 7 and with the seals 14 and 17 aligned with the respective sets of assembly grooves 20. Relative torsional displacement of the wingshaft and the abutments then displaces the seals from the respective grooves 20 and compresses the seals.

Whether a single groove is used or a pair of grooves in a set, location of the groove or grooves is desirable in such relation to the secured position of the adjacent abutment 12 as to be covered by the abutment, substantially as shown in FIGURES 1 and 4, so as to prevent reentry of the wingshaft seals into the grooves.

As a result, the wingshaft and abutment structures can be inserted into the housing bore without danger of damaging the seals. Assembling of the parts is substantially expedited and requires no special skill or delicate handling to avoid seal damage. Milling of the grooves 20 is an extremely simple machining operation which adds little to the initial cost of making the parts, and as a cost factor is greatly offset by savings effected in not only the assembling operation but freedom from seal damage and thus rejection rate of the completed units.

It will be understood that modifications and variations may be effected without departing from the scope of the novel concepts of the present invention.

We claim as our invention:
1. A method of assembling parts having close interface engagement with a pressure seal therebetween,
providing a ramp-sided groove in the interface surface of one of the parts,
assembling the parts by longitudinally introducing into the groove a projecting portion of a compressible seal in a recess in the interface surface of the other part,
and thereafter relatively shifting the parts laterally relative to the groove and thereby easing the projecting seal portion across the groove ramp and compressing it into the recess until the seal has cleared the groove and sealingly engages the interface surface of said one part.

2. The method defined in claim 1, further characterized by forming the groove on a surface of relatively large radius arc.

3. A method of assembling into the bore of a housing a part having a surface arranged to mate with the surface of the bore and wherein a recess in one of the surfaces mounts a longitudinal compressible pressure seal engageable sealingly with the opposing surface in assembly,
forming a ramp-sided groove in said opposing surface, assembling said part and said housing by longitudinal relative movement with said surfaces slidably engaged and with said seal aligned with said groove so that the seal projects into the groove during the longitudinal relative assembly movement,
and after the longitudinal assembly movement has been completed relatively torsionally shifting said part and the housing and thereby moving the seal laterally across the groove ramp and compressing it into the recess until the seal engages said opposing surface beyond the groove.

4. A method of assembling a fluid pressure device comprising a housing defining a bore surface and an abutment having a surface complementary to and adapted to mate with the bore surface with one of the surfaces having a longitudinal recess mounting a compressible pressure seal which normally projects from the recess,
forming in the other surface a ramp-sided groove of a depth to receive the seal without substantial compression, relatively longitudinally assembling the abutment and the housing with the seal aligned with and projecting into the groove,
and after longitudinal assembly has been effected relatively turning the abutment and housing until the seal has been laterally eased by the groove ramp compressively into the recess and sealingly onto said other surface.

5. A method of assembling a fluid pressure device comprising a housing defining a bore surface and an abutment having a surface complementary to and adapted to mate with the bore surface with the abutment surface having a longitudinal recess mounting a compressible pressure seal which normally projects from the recess,
forming in the bore surface a ramp-sided open ended groove of a depth to receive the seal without substantial compression,
relatively longitudinally assembling the abutment and the housing with the seal aligned with and projecting into the groove,
and after longitudinal assembly has been effected relatively turning the abutment and housing until the seal moving with the abutment has been laterally eased by the groove ramp compressively into the recess and sealingly onto said bore surface.

6. A method of assembling a fluid pressure device comprising a housing defining a bore surface and a wingshaft including a vane surface complementary to and adapted to mate with the bore surface with the vane surface having a longitudinal recess mounting a compressible pressure seal which normally projects from the recess,
forming in the bore surface a ramp-sided open ended groove of a depth to receive the seal without substantial compression,
relatively longitudinally assembling the vane and the housing with the seal aligned with and projecting into the groove,
and after longitudinal assembly has been effected relatively turning the vane and housing until the seal moving with the vane has been laterally eased by the groove ramp compressively into the recess and sealingly into said bore surface.

7. A method of assembling a rotary fluid pressure device comprising a housing having a bore surface defining a working chamber and abutment and wingshaft structures in the chamber wherein the abutment is stationary and the wingshaft has a vane,
forming a pair of longitudinal ramp-sided grooves in the bore surface,
mounting longitudinal compressible pressure seals in surfaces of the abutment and wingshaft that are arranged to mate with the bore surface,
assembling the abutment and wingshaft within the housing by relative longitudinal movement and with the seals aligned with and projecting into the respective grooves, and after longitudinal assembly has been effected, relatively turning the abutment and wingshaft and the housing and laterally easing the seals along the groove ramps onto the bore surface.

8. The method of claim 7 characterized by forming the grooves in spaced relation less than the width of the mating surface of the abutment and covering the grooves with the abutment so that the wingshaft seal is prevented from entering the groove by which it was accommodated during assembly of the parts.

9. A method of assembling abutment and wingshaft parts in a working chamber of a housing defined by a bore surface and wherein the abutment and the wingshaft have surfaces mating with the bore surface and provided with respective recesses mounting compressible pressure seals normally projecting from the recesses, forming spaced parallel ramp-sided grooves in the bore surface receptive of the projecting seals,
assembling the abutment with the wingshaft,
aligning the abutment and the wingshaft within said bore and aligning the seals with said grooves,
relatively longitudinally assembling the assembled abutment and wingshaft and the housing and longitudinally entering the projecting portions of the seals in said grooves,
and after said longitudinal assembly has been effected relatively turning the abutment and wingshaft assembly and the housing and thereby laterally easing the seals along the groove ramps compressively into the recesses and sealingly onto the bore surface.

10. In a method of assembling a plurality of abutments and a multi-vane wingshaft in a working chamber of a housing defined by a bore surface and wherein the abutments and the wingshaft vanes have surfaces to engage matingly with the bore surface and provided with longitudinal recesses mounting compressible pressure seals normally projecting from the recesses, forming in the bore surface a plurality of spaced parallel longitudinally extending ramp-sided grooves equal in number to the number of seals on all of the abutments and wingshaft vanes and so oriented as to receive all of the projecting portions of the seals simultaneously,
assembling the abutments with the wingshaft,
aligning the assembled abutments and wingshaft with the chamber bore and aligning the projecting portions of the seals with the respective grooves,
relatively longitudinally assembling the assembled abutments and wingshaft and the housing to bring said mating surfaces into engagement with the bore surface and disposing the projecting portions of the seals in said grooves,
relatively turning the abutments and wingshaft in respect to the housing and thereby laterally moving the seals along the ramps and compressing the seals into their respective recesses until the seals engage sealingly with the bore surface beyond the respective grooves,
and fixing the abutments in blocking relation to the grooves whereby the wingshaft can be rotated for full travel of the vanes in either direction between the abutments without reentry of the seals thereof into the assembly grooves.

11. An assembly of parts having interfaces engageable in close relation and including:
a ramp-sided groove in the interface surface of one of the parts,
a recess in the interface surface of the other of said parts having therein a compressible seal with a portion of the seal normally projecting from the recess,
said groove being receptive of the projecting portion of the seal by longitudinally introducing such portion into the groove,
the ramp of the groove being adapted to ease the projecting portion of the seal thereacross and compress it into the recess upon relative shifting of the parts laterally with respect to the groove until the seal has cleared the groove,
the seal engaging the interface surface of said one part.

12. An assembly as defined in claim 11 characterized in that the groove is on a surface of relatively large radius arc.

13. An assembly comprising a housing having a bore surface,
a part having a surface arranged to mate with the surface of the bore,
one of the surfaces having a longitudinally extending recess with a longitudinal compressible pressure seal mounted therein and engageable sealingly with the other and opposing surface in the assembly,
a ramp-sided groove in said opposing surface,
said groove being adapted for assembling the part within the housing by longitudinal relative movement with said surfaces slidably engaged and the seal aligned with the groove so that the seal projects into the groove during the longitudinal relative assembly movement,
said part and housing being relatively turned with respect to the groove and the seal laterally moved out of the groove by the ramp and being compressed into the recess and engaging said opposing surface sealingly beyond the groove.

14. A fluid pressure device comprising a housing defining a bore surface,
an abutment having a surface complementary to and mating with the bore surface,
one of the surfaces having a longitudinal recess mounting a compressible pressure seal which normally projects from the recess,
the other of said surfaces having a ramp-sided groove of a depth to receive the seal without substantial compression during relative longitudinal assembly of the abutment and the housing with the seal aligned with and projecting into the groove,
said groove being adapted after the abutment and the housing have been longitudinally assembled to laterally ease the seal compressively into the recess incident to relative turning of the abutment and housing,
the seal engaging the other of said surfaces sealingly.

15. A fluid pressure device comprising a housing defining a bore surface,
an abutment having a surface complementary to and mating with the bore surface,
the abutment surface having a longitudinal recess mounting therein a compressible pressure seal which normally projects from the recess,
a ramp-sided open ended groove in the bore surface of a depth to receive the seal without substantial compression during relative longitudinal assembling of the abutment and the housing and with the seal aligned with and projecting into the groove,
the groove ramp being adapted to laterally ease the seal compressively into the recess and sealingly onto the bore surface during relative turning of the abutment and housing after longitudinal assembly,
the seal engaging said bore surface sealingly.

16. A fluid pressure device comprising a housing defining a bore surface,
a wingshaft including a vane surface complementary to and mating with the bore surface,
the vane surface having a longitudinal recess mounting therein a compressible pressure seal which normally projects from the recess,
a ramp-sided open ended groove in the bore surface of a depth to receive the seal without substantial compression during relative longitudinal assembling of the vane and the housing and with the seal aligned with and projecting into the groove, the groove ramp being adapted to laterally ease the seal compressively into the recess and sealingly onto the bore surface during relative turning of the vane surface and housing after longitudinal assembly, the seal engaging said bore surface sealingly.

17. A rotary fluid pressure device comprising a housing having a bore surface defining a working chamber and abutment and wingshaft structures in the chamber wherein the abutment is stationary and the wingshaft has a vane,
a pair of longitudinal ramp-sided grooves in the bore surface,
longitudinal compressible pressure seals in surfaces of the abutment and wingshaft mating with the bore surface,
said grooves being so disposed that the abutment and wingshaft can be assembled with the housing by relative longitudinal movement and with the seals aligned with and projecting into the respective grooves,
the abutment and wingshaft being relatively displaced with respect to the grooves with the seals laterally eased out of the grooves along the groove ramps and engaging the bore surface.

18. The assembly of claim 17 characterized in that the grooves are in spaced relation less than the width of the mating surface of the abutment and substantially covered by the abutment so that the wingshaft seal is prevented from entering any groove in the rotary movements of the wingshaft in the working chamber.

19. A rotary fluid pressure device including a housing having a bore surface defining a working chamber and abutment and wingshaft structures in the working chamber having surfaces mating with the bore surface and provided with respective recesses mounting compressible pressure seals normally projecting from the recesses,
said bore having parallel ramp-sided grooves receptive of the projecting seals,
whereby the abutment and wingshaft assembled together are adapted to be aligned with the working chamber bore and with the seals aligned with the grooves and assembled into the working chamber bore by relative longitudinal assembly movement with the projecting portions of the seals in the grooves,
said abutment and wingshaft structures being turned relative to the grooves and with the seals laterally eased from the grooves by the groove ramps and under compression into the recesses and sealingly engaging the bore surface.

20. A fluid pressure device comprising a plurality of abutments and a multi-vane wingshaft,
a housing having a working chamber therein defined by a bore surface and with the abutments and wingshaft vanes provided with surfaces engaging matingly with the bore surface,
said abutment and vane surfaces having longitudinal recesses mounting compressible pressure seals normally projecting from the recesses,
said bore surface having therein a plurality of spaced parallel longitudinally extending ramp-sided grooves equal in number to the number of seals on all of the abutments and wingshaft vanes and so oriented as to receive all of the projecting portions of the seals simultaneously when the abutments and wingshaft are longitudinally assembled within the chamber simultaneously,
the seals being arranged to be compressed into their respective recesses by the groove ramps upon relative lateral turning of the abutments and wingshafts in the housing,
the seals engaging sealingly with the bore surface beyond the respective grooves,
the abutments being disposed in blocking relation to the grooves whereby the wingshaft can be rotated for full travel of the vanes in either direction between the abutments without reentry of the seals of the vanes into the assembly grooves,
and means fixing the abutments in said blocking relation.

References Cited by the Examiner

UNITED STATES PATENTS 3,030,934 4/1962 Herbst _____ 277—81
3,215,046 11/1965 Drake _____ 92—125

MARTIN P. SCHWADRON, *Primary Examiner.*

I. C. COHEN, *Assistant Examiner.*